US009225520B2

(12) United States Patent
Lorberbaum et al.

(10) Patent No.: US 9,225,520 B2
(45) Date of Patent: Dec. 29, 2015

(54) SYSTEM AND METHOD FOR DETERMINISTIC GENERATION OF A COMMON CONTENT ENCRYPTION KEY ON DISTINCT ENCRYPTION UNITS

(75) Inventors: Noam Lorberbaum, Mountain View, CA (US); Sunil C. Agrawal, Milpitas, CA (US); Katherine K. Nadell, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 601 days.

(21) Appl. No.: 12/790,512

(22) Filed: May 28, 2010

(65) Prior Publication Data
US 2013/0121487 A1    May 16, 2013

(51) Int. Cl.
| | |
|---|---|
| H04L 9/08 | (2006.01) |
| H04N 21/254 | (2011.01) |
| H04N 21/4405 | (2011.01) |
| H04N 21/4627 | (2011.01) |
| H04N 21/2347 | (2011.01) |

(52) U.S. Cl.
CPC ........ *H04L 9/0861* (2013.01); *H04N 21/23476* (2013.01); *H04N 21/2541* (2013.01); *H04N 21/4405* (2013.01); *H04N 21/4627* (2013.01); *H04L 2209/60* (2013.01)

(58) Field of Classification Search
CPC .......... H04N 21/2541; H04N 21/4405; H04N 21/4627; H04N 21/23476; H04L 2209/60
USPC ............................... 380/44; 726/26
See application file for complete search history.

(56) References Cited

U.S. PATENT DOCUMENTS

| | | | |
|---|---|---|---|
| 5,910,987 A |  | 6/1999 | Ginter et al. |
| 6,178,508 B1 * | 1/2001 | Kaufman ................ G06F 21/40 |
| | | | 713/183 |
| 6,810,122 B1 * | 10/2004 | Miyazaki ................ H04L 9/085 |
| | | | 380/277 |
| 6,959,394 B1 * | 10/2005 | Brickell ............... G06Q 20/206 |
| | | | 380/44 |
| 7,120,250 B2 * | 10/2006 | Candelore ............. H04N 5/783 |
| | | | 348/E7.056 |
| 7,299,209 B2 * | 11/2007 | Collier .................... G06F 21/10 |
| | | | 380/201 |
| 7,310,681 B2 * | 12/2007 | Cherkasova ...... H04L 29/06027 |
| | | | 707/999.202 |

(Continued)

FOREIGN PATENT DOCUMENTS

JP     2004172830 A  *  6/2004  ............... H04N 7/24

OTHER PUBLICATIONS

"Adobe Flast Access 2.0", Adobe 2010, Datasheet, downloaded on May 26, 2010.

*Primary Examiner* — James Turchen
(74) *Attorney, Agent, or Firm* — Wolfe-SBMC (57) ABSTRACT

Various embodiments of a system and method for deterministic generation of a common content encryption key on distinct encryption units are described. Embodiments may include, for each given content item of multiple content items that represent one or more portions of a common media object, controlling a different encryption unit of multiple distinct encryption units to i) generate a content encryption key for the given content item based on: a common base secret shared by the multiple distinct encryption units, and an identifier specific to the media object, and ii) encrypt the given content item with the respective content encryption key generated for that content item in order to generate a respective encrypted content item. Each content encryption key generated for a given content item may be equivalent to each other content encryption key such that decryption of each encrypted content item requires a common decryption key.

20 Claims, 5 Drawing Sheets

(56) References Cited

U.S. PATENT DOCUMENTS

| | | | | |
|---|---|---|---|---|
| 7,386,131 B2* | 6/2008 | Jing | H04L 9/0827 | 380/278 |
| 7,555,464 B2* | 6/2009 | Candelore | G06Q 20/3829 | 705/50 |
| 7,685,422 B2* | 3/2010 | Isozaki | H04L 63/061 | 713/168 |
| 7,809,134 B2* | 10/2010 | Michtchenko | H04L 9/0618 | 380/29 |
| 7,827,113 B2* | 11/2010 | Saeki | H04N 21/2541 | 705/52 |
| 7,840,489 B2* | 11/2010 | Candelore | | 705/59 |
| 7,885,894 B2* | 2/2011 | Shimoji | G06F 21/10 | 705/51 |
| 7,965,839 B2* | 6/2011 | Candelore | H04N 21/2347 | 380/200 |
| 7,965,843 B1* | 6/2011 | Maino | H04L 63/12 | 380/256 |
| 8,190,674 B2* | 5/2012 | Narayanan | H04L 65/60 | 370/229 |
| 8,219,711 B2* | 7/2012 | Visharam | G06F 15/16 | 709/246 |
| 2005/0021822 A1* | 1/2005 | Cherkasova | H04L 29/06027 | 709/232 |
| 2006/0236386 A1* | 10/2006 | Popkin | H04L 69/329 | 726/12 |
| 2006/0239451 A1* | 10/2006 | Evans | G06F 21/10 | 380/44 |
| 2006/0242078 A1* | 10/2006 | Evans | G06Q 10/06 | 705/59 |
| 2007/0005506 A1* | 1/2007 | Candelore | G06Q 99/00 | 705/59 |
| 2007/0198858 A1* | 8/2007 | Kim | G06F 21/10 | 713/193 |
| 2008/0019516 A1* | 1/2008 | Fransdonk | H04N 380/201 | 380/201 |
| 2008/0049934 A1* | 2/2008 | Onoda | G11B 20/00086 | 380/201 |
| 2008/0066182 A1* | 3/2008 | Hickmott | H04L 9/3213 | 726/26 |
| 2008/0072072 A1* | 3/2008 | Muraki | G11B 20/00086 | 713/193 |
| 2009/0138714 A1* | 5/2009 | Matsushita | H04L 9/0827 | 380/278 |
| 2009/0210346 A1* | 8/2009 | Candelore | G06Q 20/3829 | 705/57 |
| 2009/0210697 A1* | 8/2009 | Chen | H04L 9/0861 | 713/153 |
| 2010/0235641 A1* | 9/2010 | Hickmott | H04L 9/3213 | 713/170 |

* cited by examiner

SYSTEM AND METHOD FOR DETERMINISTIC GENERATION OF A COMMON CONTENT ENCRYPTION KEY ON DISTINCT ENCRYPTION UNITS

BACKGROUND

1. Field of the Invention

The present invention is directed to computer systems. More particularly, it is directed to the protection of electronic content within a computing environment.

2. Description of the Related Art

To combat unauthorized consumption of content, some content owners have adopted an approach to protecting their content known as digital rights management ("DRM"), which may include various techniques for limiting access of electronic content to authorized individuals and/or enforcing other restrictions on the use of such content. Typically, clear content that is to be protected by DRM is typically encoded and packaged into an encrypted form. At packaging time, the packaging unit responsible for packaging content may utilize various types of encryption algorithms for encrypting content. In some cases, these encryption algorithms may encrypt content based on a cryptographic key, which may be selected or generated in a random fashion. At some point, the encrypted content may be provided to an electronic device associated with a content consumer. For instance, the consumer may pay a one-time fee or a recurring subscription fee to access the content electronically. To view the content in unencrypted form on the consumer's electronic device, the device may be required to obtain a respective content license that includes the correct cryptographic key for decrypting the content.

SUMMARY

Various embodiments of a system and method for deterministic generation of a common content encryption key on distinct encryption units are described. Embodiments may include multiple packaging components, each of which may be equipped with a respective encryption unit. The packaging components may be implemented on one or more computers, according to various embodiments. The encryption units may be configured to encrypt multiple different content items, which may represent a portion of the same media object (e.g., different temporal segments of the same video or different bit rate representations of the same video). In various embodiments, each content item may be encrypted according to the same encryption key without, e.g., the use of a centralized content encryption key store. For instance, embodiments may include, for each given content item of multiple content items that represent one or more portions of a common media object, controlling a different encryption unit of multiple distinct encryption units to i) generate a content encryption key for the given content item based on: a common base secret shared by the multiple distinct encryption units, and an identifier specific to the media object, and ii) encrypt the given content item with the respective content encryption key generated for that content item in order to generate a respective encrypted content item. In various embodiments, each content encryption key generated for a given content item may be equivalent to each other content encryption key such that decryption of each encrypted content item requires the same decryption key.

While the system and method for deterministic generation of a common content encryption key on distinct encryption units is described herein by way of example for several embodiments and illustrative drawings, those skilled in the art will recognize that the system and method for deterministic generation of a common content encryption key on distinct encryption units is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for deterministic generation of a common content encryption key on distinct encryption units as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for deterministic generation of a common content encryption key on distinct encryption units are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Note that the description presented herein may include one or more references to a one-way function or a cryptographic hash function, either of which may be referred to herein as simply a hash function. Generally speaking, a cryptographic hash function may operate on a block of data in order to return a fixed-size bit string (e.g., the hash value, or simply "hash") such that an accidental or intentional change to the block of data will change the hash value (although variations thereof may be utilized in various embodiments). In some cases, the aforesaid block of data may be referred to as a "message" and the corresponding hash value may be referred to as the "message digest." In various embodiments, a hash function may include any function or set of operations operating as described above. Examples of hash functions include, but are not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions. In various embodiments, the DRM component and/or the authentication components described herein may be configured to utilize one or more cryptographic hash functions to perform cryptographic operations.

Various embodiments include various encryption and/or decryption keys, any of which may be generated via a key derivation function (KDF). Key derivation functions may include the completion of one or more iterations or instances of cryptographic operations in order to generate an encryption or decryption key. Examples of key derivation function may include but are not limited to any key derivation functions specified by Public Key Cryptography Standards (PKCS) (e.g., PKCS-5 or PKCS-12) or Adobe® Password Security. In various embodiments, KDFs may be utilized by any of the various components described herein to generate encryption keys for symmetric encryption.

Various portions of this detailed description may refer to "client(s)" and "server(s)" or similar terminology. For instance, various embodiments may include (among other elements) a client system or client device (or simply a "client"). It should be understood that the terms "client" and "server" do not impose any limitation on the operation, configuration, or implementation of such elements. It should be understood that these terms are used only as convenient nomenclature. Indeed, various embodiments are need not be limited by the principles of a conventional client-server architecture.

In various instances, this detailed description may refer to content items (which may also be referred to as "content data," "content information" or simply "data" or "information"). In some instances, content items may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe®Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

In various instances, this detailed description may refer to a devices configured to perform content consumption, such as client system 140. In various embodiments, such a device may include but is not limited to a computing system (e.g., a desktop or laptop computer), a set-top television box, a digital audio or multimedia player (e.g., an MP3 player), a personal digital assistant (PDA), a mobile phone, a smartphone, a touchscreen phone, an e-book reader, a digital photo frame, or any other device or system configured to access, view, read, write, and/or manipulate any of the content data described herein. Any of such devices may be implemented via a computer system similar to that described with respect to FIG. 5.

Note that in various instances the description presented herein may refer to a given entity performing some action. It should be understood that this language may in some cases mean that a system (e.g., a computer) owned and/or controlled by the given entity is actually performing the action.

Note that in various instances the description presented herein may refer to a public key being associated with a private key or a public key corresponding to private key. It should be understood that such statements may mean that such a public key forms a public key-private key pair with such a private key. Additionally, in some cases, a public key-private key pair may be referred to as simply a "key pair." Note that in various embodiments, public key-private key pairs may be generated via one or more key derivation functions, such as those described above.

Figure 1:
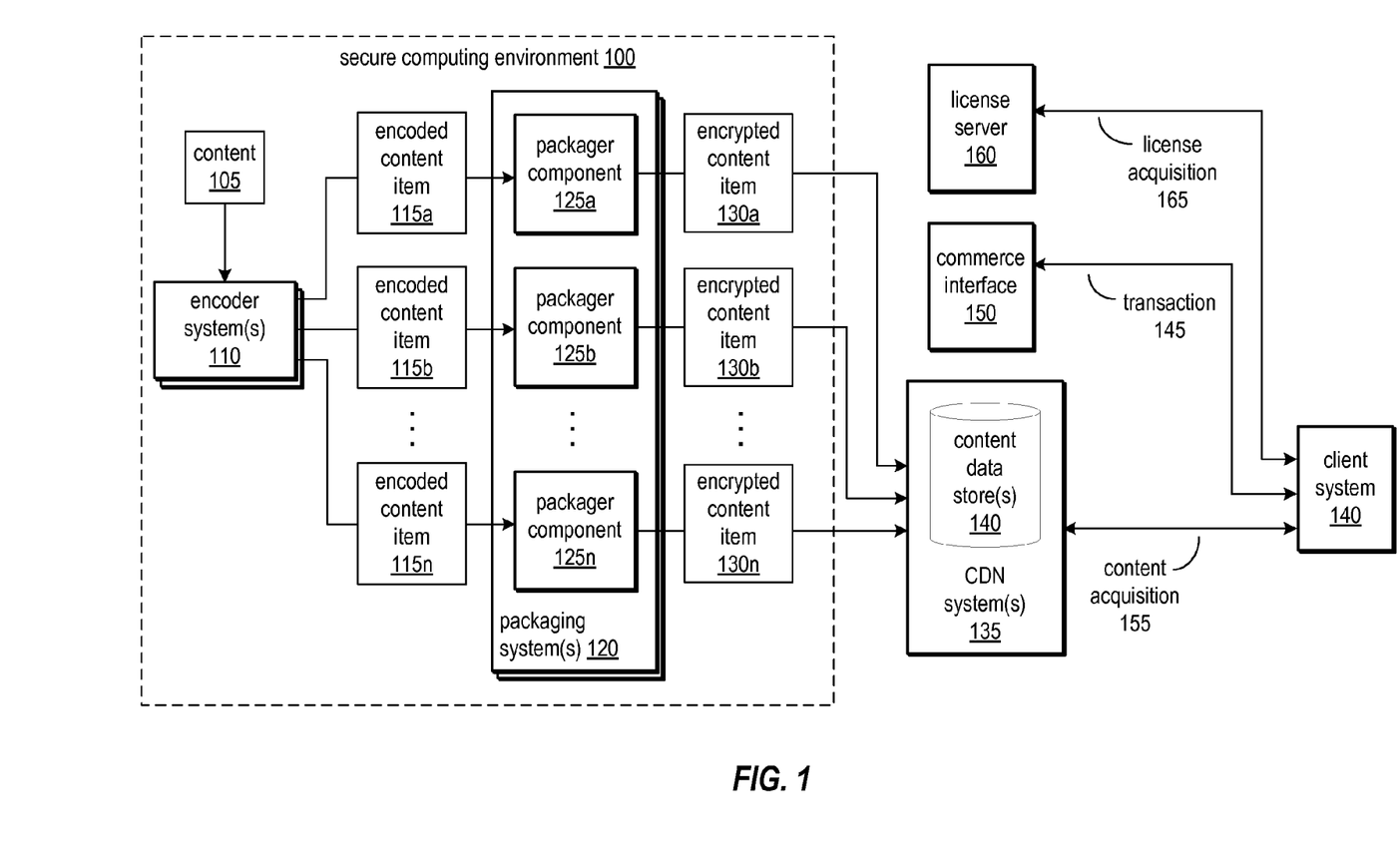
FIG. 1 illustrates an example flow diagram for generating and distributing different encrypted content items representing the same media object, according to some embodiments.

FIG. 1 illustrates an example flow diagram of the operation of various embodiments of the system and method for deterministic generation of a common content encryption key on distinct encryption units. In the illustrated embodiment, various elements may be implemented with a secure computing environment 100, which may utilize various security principles (e.g., encryption and/or network isolation of computing systems) to ensure the secrecy of sensitive cryptographic information, such as the base secrets described in more detail below. The elements illustrated as part of secure computing environment 100 may primarily be responsible for encoding, encrypting and/or packaging media objects. However, it should be understood that the elements of secure environment 100 need not be limited to these types of functionality.

In the illustrated embodiment, content 105 may represent a media object, which may include any type of media program that may be represented and/or stored as electronic content (e.g., electronic representations of audio, video, images, presentations or some combination thereof). In various embodiments, a media program may include prerecorded content including but not limited to movies or motion pictures, television programs, audio productions, as well as live content including but not limited to content conveying real-time or near-real time events (e.g., a live sporting event or competition). One or more encoder systems 110 may be configured to input content 105 and generate one or more encoded content items 115a-n corresponding to content 105. Note that a given one of such content items may be referred to as content item 115. Similarly, the group of all content items 115a-n may be referred to as content items 115.

In some embodiments, each encoded content item 115 may be a different bit rate representation of content 105. For example, content 105 may be a reference or master representation of a motion picture and content items 115 may represent that motion picture encoded at different bit rates. In one non-limiting example, encoded content item 115a may be a video of a live sporting event encoded at a bit rate of 5 Mbps (Megabits per second) whereas encoded content item 115b may be a video of the same sporting event encoded at a bit rate of 1 Mbps. In various embodiments, the differences between different encoded content items may be characterized by content resolution. For instance, in the live sporting event example above, the resolution of encoded content item 115a maybe 1280 pixels by 720 pixels whereas the resolution of encoded content item 115b may be 640 pixels by 480 pixels. In various embodiments, the differences between different encoded content items may be characterized by frames per second ("FPS"). For instance, in the live sporting event example above, the FPS of encoded content item 115a maybe 30 pixels whereas the FPS of encoded content item 115b may be 24 FPS. In general, encoded content items 115 may differ according to any modifiable parameter of a codec (e.g., an MPEG-4 codec, such as H.264) utilized by encoding system 110 during the encoding process.

In various embodiments, each encoded content item 115 may represent a different temporal segment of the same media object. For example, if the media object were a movie, each encoded content item 115 may represent a different temporal segment of that movie. Each temporal segment may be specified by a different time period of the movie, a different set of frames within the movie or a different scene within the movie, for example. As described in more detail with respect to FIG. 2, each encoded content item may be processed by a different packaging component 124a-n. In this way, different temporal segments of the same media object may be encrypted by different packaging components.

As illustrated, different encoded content items may be processed by different packager components 125a-n. Note that a given one of such packager components may be referred to as packager component 125. Similarly, the group of all packager components 125a-n may be referred to as packager components 125. In the illustrated embodiment, encoded content item 115a is processed by packager component 125a, encoded content item 115b is processed by packager component 125b, and so on. In various embodiments, any of the packager components may be implemented on one or more packaging systems 120, which may in some cases be implemented by a computer system, such as that illustrated in FIG. 5 described below. In various embodiments, different ones of packager components 125 may be implemented on different packaging systems 120. For instance, in one embodiment, a single packager component 125 may be implemented on each of the packaging systems. In other cases, some packaging systems 120 may implement a single packager component 125 while other packaging systems 120 may implement multiple packager components 125. In yet other embodiments, all packager components 125 may be implemented on the same packaging system.

As illustrated, each packager component 125a-n may package a respective encoded content item to generate a corresponding encrypted content item 130a-n. Note that a given one of such encrypted content items may be referred to as encrypted content item 130. Similarly, the group of all encrypted content items 130a-n may be referred to as encrypted content items 130. Additional details of the manner in which encrypted content items 130 are generated are described below with respect to FIG. 2. Generally, each encrypted content item may be an encrypted version of the corresponding encoded content item. In various embodiments, encrypted content item 130a may be an encrypted version of encoded content items 115a, encrypted content item 130b may be an encrypted version of encoded content items 115b, and so on. In various embodiments, even in cases where packager components 125a are implemented on distinct packaging systems, encrypted content items 130 may be generated such that all of such items are encrypted with the same content encryption key. This process is described in more detail below with respect to FIG. 2.

In various embodiments, the encryption key with which each encrypted content item is encrypted may be embedded in a metadata (e.g., a header portion) of the encrypted content item that need not be encrypted by the same encryption key used by the packager to encrypt the actual content of the encrypted content item. In various embodiments, a given encrypted content item's metadata may include an encrypted version of the content encryption key utilized to encrypt the content portion of that content item. In some embodiments, the content encryption key of the content item may be encrypted with the public key of the license server 160. As described in more detail below, this may ensure that only license server will be able to decrypt the encrypted version of the content encryption key. For instance, the license server may utilize its corresponding private key to determine the content encryption key in unencrypted form; this process is described in more detail below with respect to license acquisition 165.

In various embodiments, encrypted content items 130 may be provide to one or more content distribution network ("CDN") systems 135. CDN system(s) 135 may store the encrypted content items 135 within one or more content data store(s) 140. Encrypted content items may be retrieved from data store(s) 140 at content acquisition time.

In various embodiments, one or more client systems, such as client system 140, may interact with commerce interface 150, CDN system(s) 135 and/or license server 160 in order to obtain and access encrypted content items 130 (or other encrypted content items processed according to the techniques described herein). In various embodiments, client system 140, which may in some cases operate at least in part based on input or direction from a user, may perform a transaction 145 with a commerce 150. For example, commerce interface 150 may be an e-commerce portal of an entity that sells electronic content. If transaction 145 is successful, the commerce interface may provide client system 140 with information that directs the client system to a CDN system 135 that hosts the corresponding content. In the illustrated embodiment, transaction 145 is directed to a purchase, rental, or subscription of the media object corresponding to content 105, encoded content items 115a-n and encrypted content items 130a-n. At content acquisition 155, the client system may receive one or more of encrypted content items 130a-n. In some cases, one or more of the encrypted items may be cached or stored on client system 140 before consumption of the content. In other cases, at content acquisition 155, one or more of encrypted content items 130a-n may be streamed and consumed in a real-time or near real-time fashion on the client system. In some cases, this method of data distribution and playback may be well-suited for the distribution of live content (e.g., a live sporting event), for example.

In some embodiments, the particular content items of encrypted content item(s) 130 that are provided to the client system may vary over time. For instance, the client system may determine that the network bandwidth of the client has changed and request a more appropriate encrypted content item for the new bandwidth. For instance, if the network bandwidth decreases, the client system may request a lower bit rate encrypted content item for the same media object. In one non-limiting example, if the client system were consuming a streamed video representation of a live sporting event and network bandwidth is suddenly restricted, the client may request a lower bit rate version of that same live sporting event suitable for the new network capacity. In other cases, the CDN system providing the content may be responsible for the process of switching between content items of different bit rates. In other cases, such as when encrypted content items 130a represent different temporal segments of the same media object (e.g., different segments of the same movie), client system 140 may need to switch between different ones of the encrypted content items during the natural progression of the media object (e.g., as specified by a corresponding manifest or playlist).

In any case, there may be some circumstances in which client system 140 may switch between one encrypted content item 130 to another encrypted content item 130. As described in more detail below with respect to FIG. 2, each encrypted content item 130a-n may require the same decryption key to decrypt that content item. (due to the manner in which the various packager components encrypt the content items). Due at least in part to the manner in which such encryption is performed, client system 140 may utilize the same decryption key to decrypt any of encrypted content items 130a-n. In various embodiments, this may facilitate seamless playback (e.g., consumption) of the different content items on the client. For example, the client system can continue to use the same decryption key for decryption before and after the transition from one content item to another during playback.

To obtain the decryption key for decrypting any of encrypted content items 130a-n, client system 140 may perform a license acquisition 165 with license server 160. As described above, each encrypted content item may have a metadata portion that includes an encrypted version of the content encryption key used to encrypt that content item. This encrypted content encryption key may have been encrypted with the public key of license server 160. At 165, the client system may submit this encrypted content encryption key to license server 160 as part of a license request. After the license server 160 positively authenticates the client system (if required), the license server may use its own private key to decrypt the encrypted content encryption key to determine the unencrypted version of the content encryption key. The license server may then re-encrypt the content encryption key with client system 140's public key (or a public key of the application that is to consume the content) such that only client system 140 can properly decrypt that content encryption key. The result of this re-encryption is provided within a response sent from the license server 160 to client system 140. The client system may decrypt the encrypted content decryption key from that response with the corresponding private key. This content encryption key may be used to decrypt one of encrypted content items 130. In various embodiments, as described above, the client system may use this same content encryption key to decrypt subsequent ones of encrypted content items 130. For instance, that same content encryption key may be utilized to decrypt all of encrypted content item's 130a-n.

Figure 2:
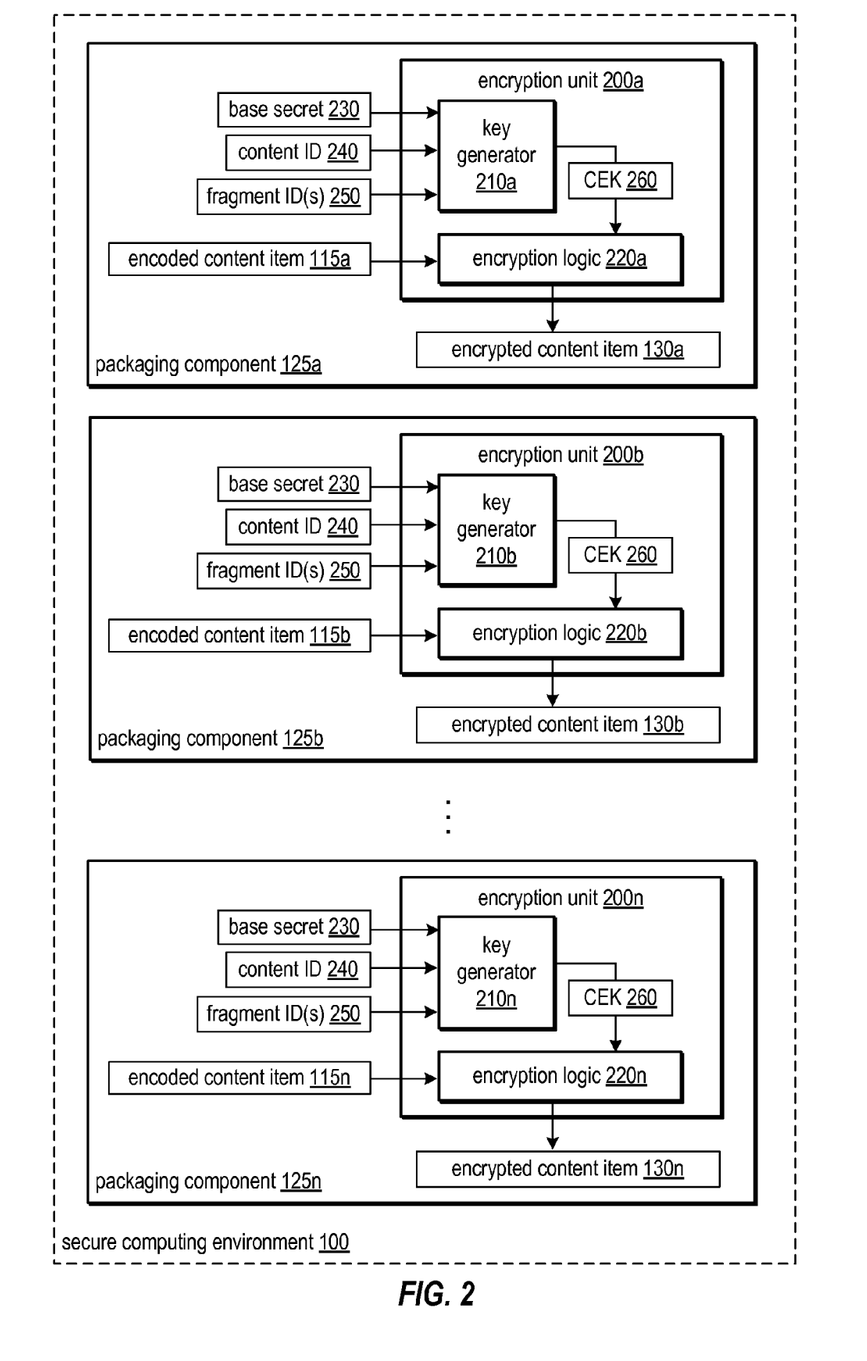
FIG. 2 illustrates an example flow diagram of the operation of multiple packager components, according to some embodiments.

As described above, even though different encoded content items 115 may be encrypted by different packager components 125, each of the corresponding encrypted content items 130 may each require the same key for decryption. FIG. 2 illustrates a flow diagram of the operation of packager components 125. As illustrated, each packager component may include a corresponding encryption unit (illustrated as encryption units 200a-n). Note that a given one of such encryption units may be referred to as encryption unit 200. Similarly, the group of all encryption units 200a-n may be referred to as encryption units 200. In the illustrated embodiment, each encryption unit is provisioned with a base secret 230, which is the same across different encryption units and packager components. Each encryption unit may also determine a content identifier ("content ID") for the media object represented by the content items that is to be encrypted. The content ID may be the same for all encoded content items of the same media object. In this case, the content that is to be encrypted includes encoded content items 115a-n (note that all of such content items represent the same media object); each of encoded content items 115a-n may have the same content ID, denoted as content ID 240.

Each encryption unit 200 may include a respective key generator 210a-n. Note that a given one of such key generators may be referred to as key generator 210. Similarly, the group of all key generators 210a-n may be referred to as key generators 210. In various embodiments, each key generator may generate a respective content encryption key ("CEK") with which the respective content item is to be encrypted. For instance, encryption unit 200a may generate CEK 260 for encoded content item 115a, encryption unit 200b may generate the same CEK 260 for encoded content item 115b, and so on. In various embodiments, each key generator 210 may generate the same CEK 260 by virtue of basing the key generation process on the same information, namely base secret 230 and content ID 240. In various embodiments, key generator may implement one or more hash function to generate CEK 260. In various embodiments, each key generator 210 may apply a hash function or digest algorithm (e.g., SHA-256) to the base secret and content ID by treating base secret 230 as a password input into the hash function or digest algorithm and treating content ID 240 as a cryptographic salt input into the hash function or digest algorithm. In various embodiments, the generation of the CEK based on the base secret and the content ID may be performed according to one or more techniques specified by PKCS-12 v1.0. For instance, in one non-limiting example, the cryptographic hash function utilized by each key generator may be SHA-256 with an iteration count of one (1). In this example, base secret 230 may be utilized as the password input into SHA-256 and content ID 240 may be input into SHA-256 as a cryptographic salt in order to generate CEK 260. In other embodiments, any other hash function or digest algorithm may be utilized provided it is applied to both base secret 230 and content ID 240 to generate CEK 260.

By having each packaging unit generate respective content encryption keys according to the techniques described herein, embodiments may avoid the use of a centralized database of content encryption keys. By avoiding the use of a centralized database of content encryption keys, embodiments may provide a packaging environment in which the individual packagers are not burdened with performing lookup operations for the content encryption keys corresponding to various content items. Instead, for a given portion of content, each individual packaging component may independently generate the same content encryption key.

As illustrated, due to the way inputs are handled as described above, each key generator generates the same CEK 260 and passes that CEK to the respective encryption logic 220a-n. Note that a given one of such encryption logics may be referred to as encryption logic 220. Similarly, the group of all encryption logics 220a-n may be referred to as encryption logics 220. In various embodiments, each encryption logic may encrypt the corresponding encoded content item with CEK 260 to generate the corresponding encrypted content item 130a-n. For instance, encryption logic 220a may encrypt encoded content item 115a with CEK 260 to generate encrypted content item 130a, encryption logic 22b may encrypt encoded content item 115b to generate encrypted content item 130b, and so on. In various embodiments, this encryption process utilized by each encryption logic may include any of various symmetric encryption processes where CEK 260 is utilized as symmetric encryption key.

By having each encrypted content item 130a-n symmetrically encrypted with the same encryption key (even though different encrypted content items are created by different encryption units), various embodiments may ensure that decryption of each encrypted content item requires the same key. As is the case for symmetric encryption, the same key used for encryption is also used for decryption. Accordingly, in various embodiments, CEK 260 may also be the decryption key required to decrypt encrypted content items 130a-n. As described above with respect to FIG. 1, the encryption key (e.g., CEK 260) may in various embodiments be encrypted with the public key of license server 160 and embedded within each encrypted content item; this process may be performed by each encryption unit in various embodiments.

In various embodiments, the above described techniques for encrypting different encoded content items may be performed at a fragment level. For instance, in various embodiments, a given encoded content item 115 may include multiple different fragments. For example, for an encoded content item that represent a segment of a video, each fragment of that content item may represent a certain number of frames or seconds of video. In some embodiments, a key generation process similar to that described above may be performed at the fragment level by generating the fragment encryption key (similar to CEK 260) based on a fragment identifier 250 for that fragment and base secret 230. For instance, key generator may apply a hash function to base secret 230 and the fragment identifier 250 in a manner similar to that described above with respect to generation of CEK 260. This process may be repeated for each fragment of the encoded content item. In these embodiments, an encrypted content item 130 may actually include multiple distinct encrypted fragments.

Figure 3:
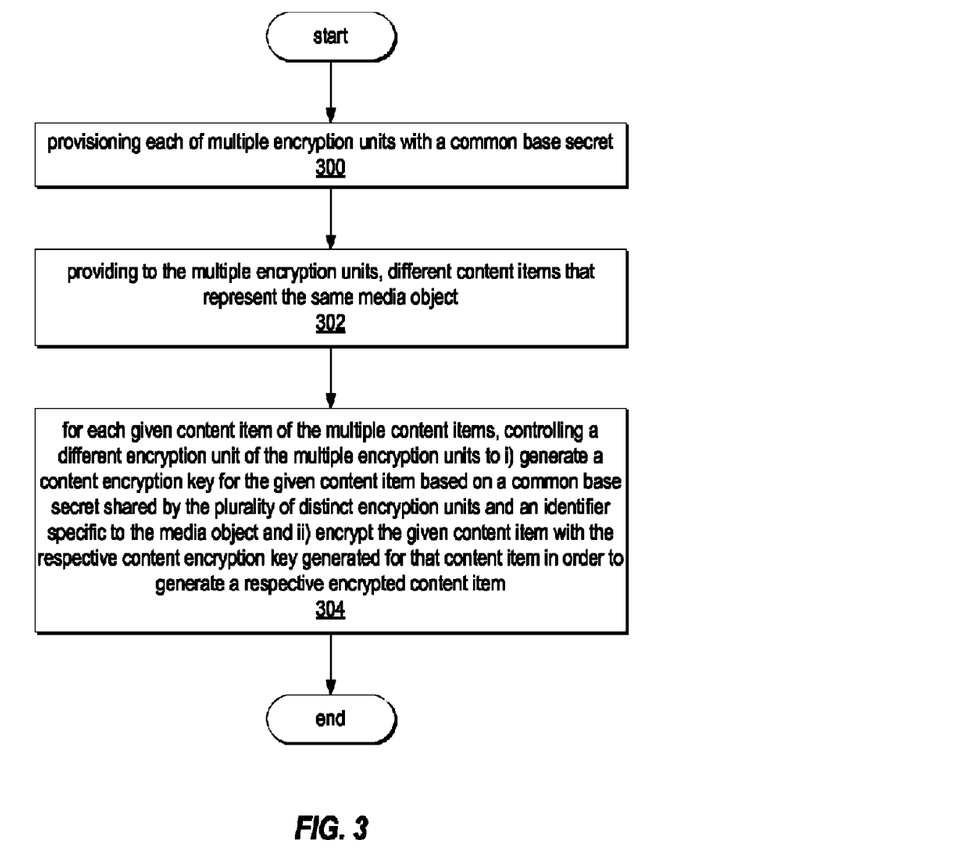
FIG. 3 illustrates a flowchart of an example method for controlling multiple encryption units to generate a common encryption key for different content items and encryption such content items with that common encryption key, according to some embodiments.

Embodiments of the system and method for deterministic generation of a common content encryption key on distinct encryption units may include various methods. FIG. 3 illustrates a flowchart of an example method, according to some embodiments. In various embodiments, the illustrated method may be performed by one or more computer systems, such as that of FIG. 5 described below.

As illustrated by block 300, the method may include provisioning each of multiple encryption units with a common base secret. In various embodiments, this may include providing base secret 230 to each encryption unit 200, as illustrated in FIG. 2. In embodiments where encryption units 200 are implemented on computer systems (such as that of FIG. 5), the computer system may include a local secure key store in which the base secret may be stored. In various embodiments, the provisioning of the base secrets may be limited to secure computing environments, such as secure computing environment 100 described above.

As illustrated by block 302, the method may include providing to the multiple encryption units, different content items that represent the same media object. As described above, a media object may include any type of media program that may be represented and/or stored as electronic content (e.g., electronic representations of audio, video, images, presentations or some combination thereof). In various embodiments, a media program may include prerecorded content including but not limited to movies or motion pictures, television programs, audio productions, as well as live content including but not limited to content conveying real-time or near-real time events (e.g., a live sporting event or competition). One example of providing multiple encryption units with different content items is illustrated by providing each encryption unit 200 with a different encoded content item 115 in FIG. 2.

As illustrated by block 304, the method may also include, for each given content item of the multiple content items, controlling a different encryption unit of the multiple encryption units to i) generate a content encryption key for the given content item based on a common base secret shared by the plurality of distinct encryption units and an identifier specific to the media object, and ii) encrypt the given content item with the respective content encryption key generated for that content item in order to generate a respective encrypted content item. For instance, in an example including encryption units 200, the method may include controlling each encryption unit to generate multiple equivalent CEKs 260 and encrypting each of encoded content items 115 with that CEK to generate a respective one of encrypted content items 130a-

*n*. In various embodiments, each content encryption key (e.g., CEKs 260) generated for a given content item is equivalent to each other content encryption key such that decryption of each encrypted content item requires a common decryption key. In various embodiments, the above described portion of the method may include performing a cryptographic hash function to generate the content encryption key in a manner similar to that described above with respect to FIG. 2. Similarly, in various embodiments, the above-described portion of the method may include performing a symmetric encryption process with the content encryption key in a manner similar to that described above with respect to FIG. 2.

In various embodiments, the method described above may be repeated for different content producers or content retailers. In these instances, a different base secret may be utilized for each different content producer. In this way, content ID's need not be unique per content producer because each content producer may utilize a different base secret for encryption.

Various modifications to the above-described method may be performed while adhering to the spirit and scope of various embodiments. In general, any functionality described herein with respect to packager components 125 may be implemented as an action within the computer-implemented method of FIG. 3.

Figure 4:
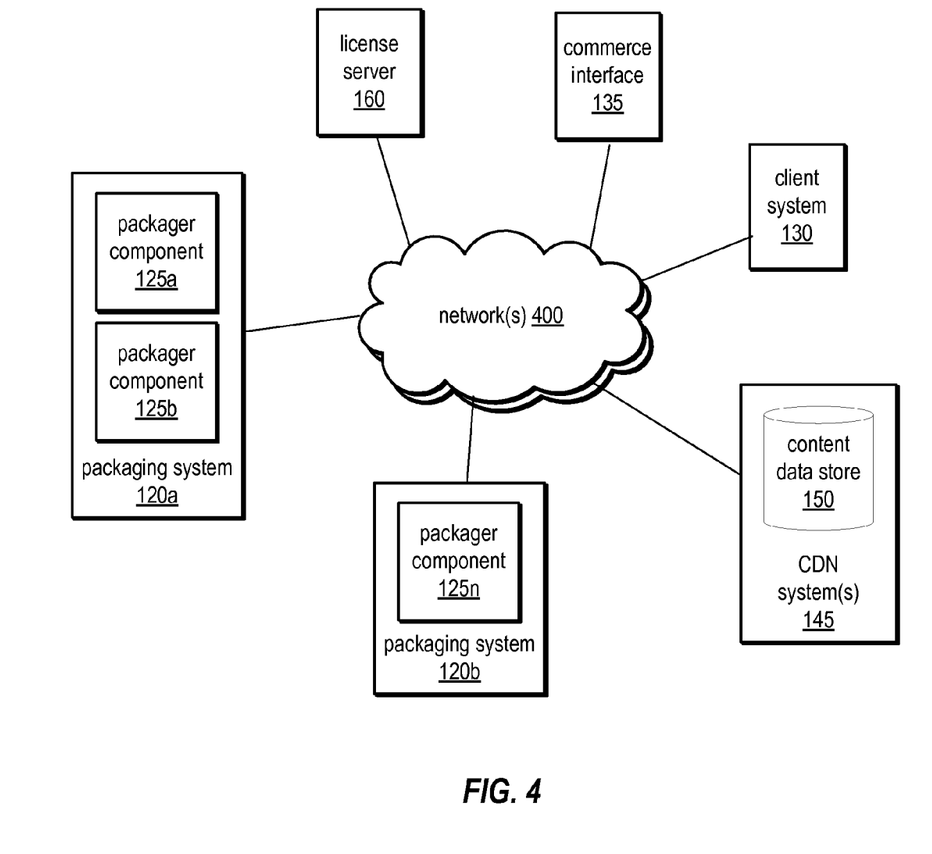
FIG. 4 illustrates an example system configuration including multiple packager components, according to some embodiments.

FIG. 4 illustrates an example system configuration that may be utilized in some embodiments. In various embodiments, any of the illustrated elements may be implemented as one or more computer systems, such as that of FIG. 5 described below. Likewise any component illustrated (e.g., packager components 125*a-n*) may be illustrated as executable instructions operating a computer system, such as the executable instructions of the computer system of FIG. 5 described below. In other embodiments, such components may be implemented strictly as hardware or some combination of hardware and computer-executable instructions. In the illustrated embodiments, elements may communicate with other elements over one or more networks 400. Network(s) 400 may be a variety of one or more networks including but not limited to Local Area Networks (LANs), Wide Area Networks (WANs), telecommunication networks (e.g., mobile voice and data networks), some other type of network, or some combination thereof.

In some embodiments, multiple packager components 125 may be implemented on the same computer system. For instance, in an embodiment where packaging system 120*a* is implemented by a computer system, packager component 125*a* and packager 125*b* may be implemented as different executable instances of the same packager component. In some cases, some computer systems may implement only one packager component. For instance, in an embodiment where packaging system 120*b* is implemented by a computer system, packager component 125*n* may be the sole packager component implemented as an executable instance of the packager component on that computer system.

Secure Communication

In various embodiments, techniques similar to those utilized to bind a content license to a license server may provide secure communication between any of the elements of the above-described framework. For instance, various elements of the illustrated framework may be associated with respective public key-private key pairs, such as key pairs utilized in Public Key Infrastructure (PKI). In the illustrated framework, a first element may securely transfer data to a second element by encrypting that data with the second element's public key. In this manner, only the second element will be able to decrypt the encrypted data to access the unencrypted data, according to various embodiments. For instance, since in various embodiments knowledge of the private key may be required to decrypt the data and since the second element may be the only element that has knowledge of its own private key, the second element may be the only element able to decrypt the data with the correct private key. Note that the aforesaid techniques may in various embodiments be utilized for any transfer of data within the system of FIG. 2. One example includes the "binding" of a content license to client system 140 at license acquisition 140. For example, license server 160 might obtain a public key for the client system 140 and encrypt a content license with that public key prior to transferring the license to the playback device. In this example, only client system 140 will be able to decrypt the license (since the playback device may be the only element with knowledge of the correct private key). In some embodiments, a given element may trust another element with knowledge of its private key (thereby allowing the other element to decrypt data encrypted with the given element's public key). In various embodiments, the public keys described herein may be obtained from a public key certificate, such as a certificate provided by a certificate authority (not illustrated) in PKIs. One example of such a certificate is an X.509 certificate (in other cases, other types of public key certificates may be utilized).

Example Computer System

Various embodiments of a system and method for deterministic generation of a common content encryption key on distinct encryption units, as described herein, may be executed on one or more computer systems, which may interact with various other devices. One such computer system is computer system 500 illustrated by FIG. 5, which may in various embodiments implement any of the systems, devices, elements or methods illustrated in FIGS. 1-4. For instance, any of the functionality described above may be stored in memory as processor-executable executable program instructions 522 (e.g., program instructions executable by processor(s) 510). In one non-limiting example, instructions 522 may implement one or more packager components 125, as illustrated. In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements.

Figure 5:
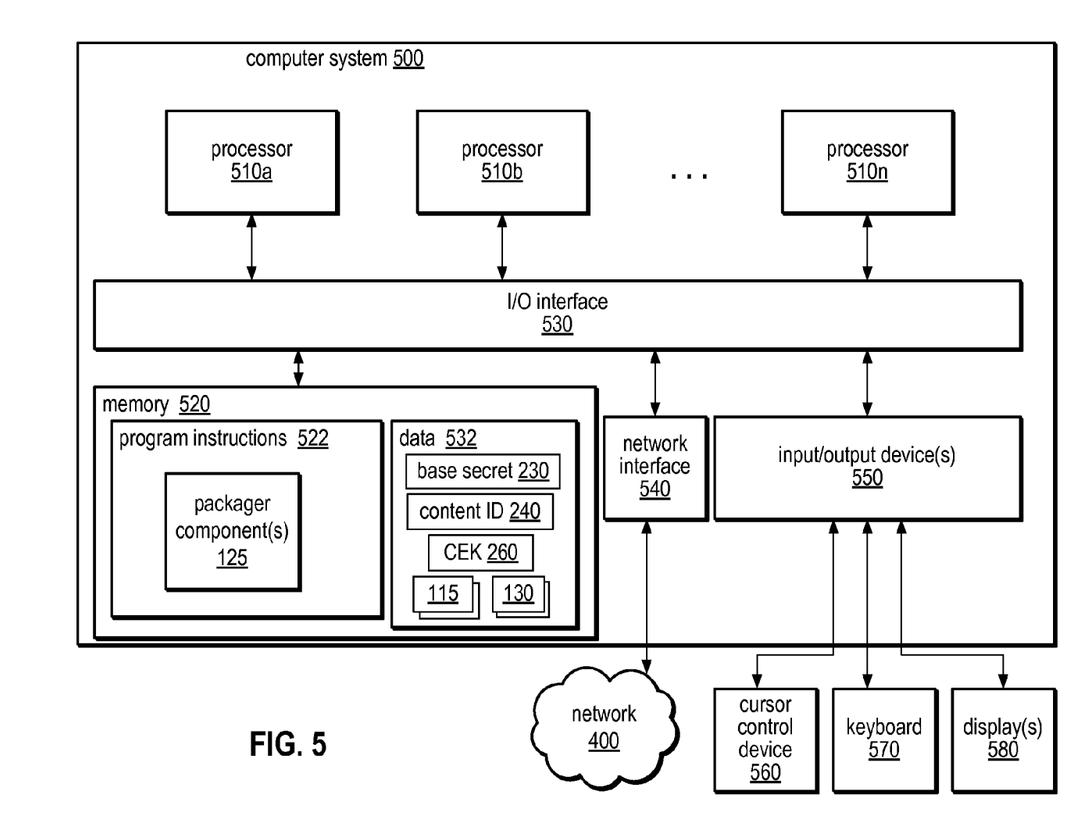
FIG. 5 illustrates an example computer system suitable for implementing various components of the system and method for deterministic generation of a common content encryption key on distinct encryption units, according to various embodiments.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510.

In various embodiments, program instructions 522 may be executable by the processor(s) to implement the functionality of any packaging component, encryption unit, encoder system, license server, commerce interface, CDN system or client system described above. As illustrated, in various embodiments, data 532 may store one or more of: base secret 230, content ID 240, CEK 260, encoded content item(s) 115, encrypted content item(s) 130 and/or fragment identifier(s) 250 (not illustrated). In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the computer system, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 400), such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the method illustrated by FIG. 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, set top television boxes, pagers, and/or any other electronic device described herein. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
performing by one or more computers operations comprising:
receiving multiple content items that each represent one or more different respective portions of an instance of content, including an individual content item that comprises multiple fragments each with a respective fragment identifier;
generating a content encryption key individually for each of the multiple content items including using a common base secret as a password input into a key generation function and an identifier specific to said instance of content as a cryptographic salt input into the key generation function to generate content encryption keys for respective content items of the multiple content items, the common base secret being specific to a content provider from which the multiple content items are received and for the individual content item, generating fragment encryption keys by generating a respective fragment encryption key for each of the multiple fragments using the common base secret and a respective fragment identifier;
encrypting each of the multiple content items with the respective content encryption key generated for that content item in order to generate a respective encrypted content item, wherein each content encryption key generated for a given content item is equivalent to each other content encryption key such that decryption of each encrypted content item uses a common decryption key and for at least some of the multiple content items, utilizing separate encryption units to encrypt individual content items of the at least some of the multiple content items;
encrypting the multiple fragments of the individual content item utilizing a respective fragment encryption key for each of the multiple fragments to generate multiple encrypted fragments for the individual content item; and
providing the common decryption key and the fragment encryption keys to enable the common decryption key and the fragment encryption keys to be used as part of a decryption process to decrypt the encrypted content items for the instance of content.

2. The computer-implemented method of claim 1, wherein the encryption of each content item is performed according to a symmetric encryption process, wherein said common decryption key is equivalent to each content encryption key generated.

3. The computer-implemented method of claim 1, wherein the method comprises:
generating an encrypted content encryption key by encrypting a given content encryption key, wherein the encrypted content item encrypted with that content encryption key is generated such that metadata of that encrypted content item includes the encrypted content encryption key.

4. The computer-implemented method of claim 1, wherein said instance of content includes one or more of: a motion picture, a television program, or a live programming broadcast in real-time or near real-time.

5. The computer-implemented method of claim 1, wherein at least some of said content items are different representations of said instance of content encoded according to different bit rates.

6. The computer-implemented method of claim 1, wherein at least some of said content items are different temporal segments of the instance of content.

7. The computer-implemented method of claim 1, wherein said base secret is specific to a particular content provider, wherein the method comprises repeating said generating and said encrypting for a different instance of content and different content provider by utilizing a different base secret that is specific to that different content provider.

8. The computer-implemented method of claim 1, wherein generation of a given content encryption key comprises applying a cryptographic hash function to the base secret and the identifier specific to said instance of content.

9. The computer-implemented method of claim 8, wherein the base secret is input into the cryptographic hash function as a password, wherein the identifier specific to said instance of content is input into the cryptographic hash function as a cryptographic salt.

10. The computer-implemented method of claim 1, wherein the method comprises, prior to said generating, provisioning the common base secret to each of multiple encryption units that perform said generating.

11. A system, comprising:
a memory; and
one or more processors coupled to the memory, wherein the memory comprises program instructions executable by the one or more processors to perform operations including:
receiving multiple content items that each represent one or more different respective portions of an instance of content, including an individual content item that comprises multiple fragments each with a respective fragment identifier;
generating a content encryption key individually for each of the multiple content items including using a common base secret as a password input into a key generation function and an identifier specific to said instance of content as a cryptographic salt input into the key generation function to generate content encryption keys for respective content items of the multiple content items, the common base secret being specific to a content provider from which the multiple content items are received and for the individual content item, generating fragment encryption keys by generating a respective fragment encryption key for each of the multiple fragments using the common base secret and a respective fragment identifier;
encrypting each of the multiple content items with the respective content encryption key generated for that content item in order to generate a respective encrypted content item, wherein each content encryption key generated for a given content item is equivalent to each other content encryption key such that decryption of each encrypted content item uses a common decryption key and for at least some of the multiple content items, utilizing separate encryption units to encrypt individual content items of the at least some of the multiple content items;
encrypting the multiple fragments of the individual content item utilizing a respective fragment encryption key for each of the multiple fragments to generate multiple encrypted fragments for the individual content item; and
providing the common decryption key and the fragment encryption keys to enable the common decryption key and the fragment encryption keys to be used as part of a decryption process to decrypt the encrypted content items for the instance of content.

12. The system of claim 11, wherein to generate a given content encryption key the program instructions are configured to apply a cryptographic hash function to the base secret and the identifier specific to said instance of content.

13. The system of claim 12, wherein the operations include inputting the base secret into the cryptographic hash function as a password, and inputting the identifier specific to said instance of content into the cryptographic hash function as a cryptographic salt.

14. The system of claim 11, wherein the operations include causing one or more encryption units to concurrently generate respective content encryption keys.

15. The system of claim 11, wherein said instance of content includes one or more of a motion picture, a television program, or a live programming broadcast in real-time or near real-time.

16. A computer-readable storage device, storing program instructions computer-executable on a computer system to perform operations comprising:
  receiving multiple content items that each represent one or more different respective portions of an instance of content, including an individual content item that comprises multiple fragments each with a respective fragment identifier;
  generating a content encryption key individually for each of the multiple content items including using a common base secret as a password input into a key generation function and an identifier specific to said instance of content as a cryptographic salt input into the key generation function to generate content encryption keys for respective content items of the multiple content items, and for the individual content item, generating fragment encryption keys by generating a respective fragment encryption key for each of the multiple fragments using the common base secret and a respective fragment identifier;
  encrypting each of the multiple content items with the respective content encryption key generated for that content item in order to generate a respective encrypted content item, wherein each content encryption key generated for a given content item is equivalent to each other content encryption key such that decryption of each encrypted content item uses a common decryption key and for at least some of the multiple content items, utilizing separate encryption units to encrypt individual content items of the at least some of the multiple content items;
  encrypting the multiple fragments of the individual content item utilizing a respective fragment encryption key for each of the multiple fragments to generate multiple encrypted fragments for the individual content item; and
  providing the common decryption key and the fragment encryption keys to enable the common decryption key and the fragment encryption keys to be used as part of a decryption process to decrypt the encrypted content items for the instance of content.

17. The computer-readable storage device of claim 16, wherein the encryption of each content item is performed according to a symmetric encryption process, wherein said common decryption key is equivalent to each content encryption key generated.

18. The computer-readable storage device of claim 16, wherein at least some of said content items are different representations of said instance of content encoded according to different bit rates.

19. The computer-readable storage device of claim 17, wherein at least some of said content items are different temporal segments of the instance of content.

20. The computer-readable storage device of claim 16, wherein said instance of content includes one or more of a motion picture, a television program, or a live programming broadcast in real-time or near real-time.

* * * * *

UNITED STATES PATENT AND TRADEMARK OFFICE
CERTIFICATE OF CORRECTION

| | | |
|---|---|---|
| PATENT NO. | : 9,225,520 B2 | Page 1 of 1 |
| APPLICATION NO. | : 12/790512 | |
| DATED | : December 29, 2015 | |
| INVENTOR(S) | : Lorberbaum et al. | |

It is certified that error appears in the above-identified patent and that said Letters Patent is hereby corrected as shown below:

In the Claims:

Column 18, claim 19, line 29, after "claim", delete "17", insert -- 16 --, therefor.

Signed and Sealed this
Nineteenth Day of April, 2016

Michelle K. Lee
*Director of the United States Patent and Trademark Office*